Feb. 15, 1966   E. W. S. NICHOLSON ETAL   3,235,407
LOW VOLTAGE FUEL CELL SYSTEMS

Filed April 17, 1961   4 Sheets-Sheet 1

Edward W.S. Nicholson
Charles E. Schleckser, Jr. Inventors
Herbert H. Vickers
By *Laurie M. Thomas*   Patent Attorney Feb. 15, 1966 E. W. S. NICHOLSON ETAL 3,235,407
LOW VOLTAGE FUEL CELL SYSTEMS
Filed April 17, 1961 4 Sheets-Sheet 2

Edward W. S. Nicholson
Charles E. Schleckser, Jr. Inventors
Herbert H. Vickers
By Edwin M. Thomas
Patent Attorney Edward W.S. Nicholson
Charles E. Schleckser, Jr. Inventors
Herbert H. Vickers By *Edwin M. Thomas*    Patent Attorney Feb. 15, 1966 E. W. S. NICHOLSON ETAL 3,235,407
LOW VOLTAGE FUEL CELL SYSTEMS
Filed April 17, 1961
4 Sheets-Sheet 4

Edward W.S. Nicholson
Charles E. Schleckser, Jr. Inventors
Herbert H. Vickers

By *Edwin M. Thomas*

Patent Attorney

United States Patent Office 3,235,407
Patented Feb. 15, 1966

3,235,407
LOW VOLTAGE FUEL CELL SYSTEMS
Edward W. S. Nicholson, Summit, Charles E. Schleckser, Jr., Clark Township, Union County, and Herbert H. Vickers, Union, N.J., assignors to Esso Research and Engineering Company, a corporation of Delaware
Filed Apr. 17, 1961, Ser. No. 103,327
4 Claims. (Cl. 136—86)

The present invention relates to a low voltage fuel cell system. It relates particularly to a system involving a large number of fuel cell elements connected together electrically to obtain large electric current output at relatively low voltage from a compact fuel cell assembly. Although not limited thereto, it has particular application to assemblies suitable for use in commercial operations requiring heavy currents at low or moderate voltages such as electroplating, electrolytic purification of metals and analogous applications. It has application to other processes, including reduction of metals, such as aluminum, magnesium, etc., from their ores. It also has utility for supplying power for various electro-chemical reactions and may be used directly for conversion of fuels to partially oxidized chemical derivatives with concurrent production of power.

In a co-pending application filed by two of the present inventors and a co-inventor, Serial No. 95,118, filed March 13, 1961, now abandoned, there is described an analogous fuel cell system wherein electrode elements are fitted together in a compact manner to provide a large effective electrode surface in a relatively small volume. In that system, the emphasis is on higher voltage but the arrangement is such that electrolytes properly surround and contact the effective surfaces of the electrodes. It is also such that fluid fuel and a fluid oxidizer, such as air, can be made freely and abundantly availabl to the electrodes for operation of the fuel cell system. In the present case, the elements are also closely packed but the electrode elements are interleaved so as to present a relatively very large surface area at each electric potential. Groups of such elements may be and in some cases will be placed in series, but the arrangements shown herein are designed more particularly for obtaining high areas of electrode surface with relatively few series connections. By arranging electrode elements in a group along a supporting structure in a back-to-back relationship and feeding fuel to one side and an oxidizer (such as air) to the other, while the said electrode elements of the group are all at essentially the same potential, external electrical connections are rendered largely unnecessary. Moreover, the internal electrical resistance, under the resulting heavy current conditions, is minimized. This is an important factor in commercial operation of a fuel cell assembly. In other words, an object of the invention is the generation and transmission of very large fuel cell currents, coupled with a simple and economical distribution and collection of such currents in each unit of a series.

In the aforesaid application, a detailed arrangement of electrodes closely packed together so as to obtain the desired large surface area while, at the same time, simplifying the electrical connections, is explained. In that case, the individual cells within a given pack of such cells are connected in series. The present invention uses some related features but is particularly designed to combine the fuel cell components in an effective manner with a maximum of simplicity for low voltage and high current applications. For this purpose, groups of electrode elements within a fuel cell pack are arranged in parallel. The present invention therefore has as a primary object the grouping of fuel cell elements in a manner to provide large effective surface areas, with high output. An ancillary object is to design efficient electrical connections so as to reduce internal electrical losses towards a practical minimum.

Further objects of the present invention are to devise a compact assembly of large power output per unit volume, to provide a simple arrangement for supplying raw materials such as fuel and oxidizer to the system, to devise efficient means for withdrawing the waste products or recirculating products capable of re-use such as excess fuel, to develop means for maintaining equal electrolyte levels in a series of cells, and to make other arrangements to facilitate operation, maintenance and repair.

Still another object is to assembly a plurality of semi-packs of cells into complete, interleaved operative cell assemblies in a novel manner.

An ancillary object is to devise a multiple cell arrangement such that it lends itself well to chemical conversion operations concurrently with power production.

These and other objects will be more readily apparent by reference to the attached drawings, wherein FIG. 1 is a partially broken perspective view of a system or assembly embodying the present invention with certain parts broken away;

Figure 1:
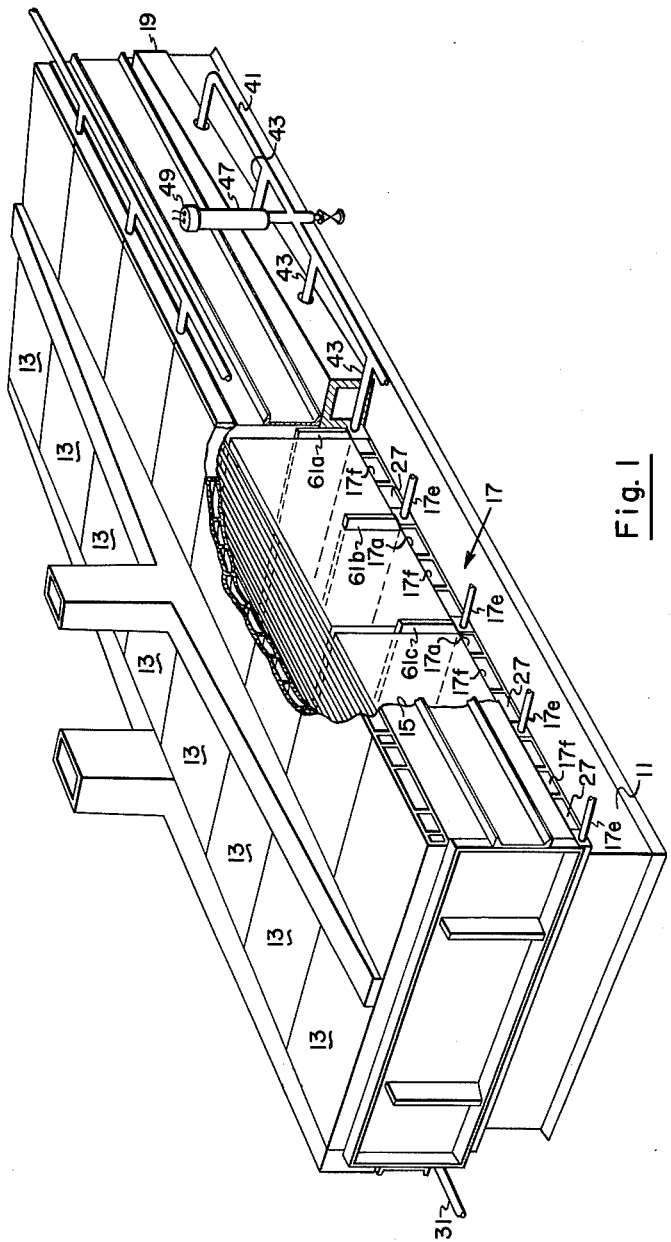

Referring first now to FIG. 1, there is shown a supporting base element 11 of suitable form on which is mounted a series of fuel cell assemblies or units 13, eight of these units being shown in the example of FIG. 1. These individual cell units 13 are arranged in closely packed fashion, somewhat analogous to the arrangement described in detail in the aforementioned co-pending application. The cell unit structures 13 themselves are each semi-cell pack units since each is only part of a complete operative cell pack assembly as will be explained. Each comprises a casing 15 which rests on a channeled or manifold structure 17. Each structure or manifold 17 is equipped with suitable ducts 17f, 17a and 17e for supplying fuel, air and electrolyte liquid to the cells. Each of the manifold units 17 at the bottom of a cell semi-pack is designed to feed fuel, air, or electrolyte, respectively, to a proper position with respect to the appropriate fuel electrode, air electrode, or electrolyte chamber.

Along the front of the manifold elements 17, there is provided an air distributor system consisting of a duct 19 which is adapted to supply air from a primary inlet to the respective cells. The duct 19 has appropriate outlets which connect with appropriate channels 17a in the manifold 17 to supply air for combustion purposes. In FIG. 1, an arrangement is shown to supply air at a plurality of points. Thus, an additional air channel 27 in each manifold 27 is provided for each cell unit or semi-pack so that resistance to air flow is minimized and availability of oxygen in the air supplied to the respective electrode elements is maximized. Also, abundant excess air is made available for removing water formed during the electro-chemical reactions in the cells.

A fuel inlet line 31 is provided along the rear side of the assembly and it has manifold connections to supply fuel to each cell through a channel 17f. As shown in FIG. 1, the channel 17f may be placed between the air channels 17a and 27, although this arrangement can be varied if desired. It will be understood that one connection from the fuel line 31 will be made to each fuel cell pack unit 13 to supply its channel 17f with fluid fuel, either gaseous or liquid. If desired, means may be provided for assembling cell pack units 13 in end-to-end relationship as well as side-by-side. That is, another row could be placed along the front or back as seen in FIG. 1. In this case the channels 17a, 27 for air, and 17f for fuel would be connected to continue throughout the width of the assembly, the manifolds 19, 31 being connected to the outermost.

Electrolyte connections are furnished through a conduit 41 having branches 43 which connect with channels or passages 17e in each fuel cell pack. An electrolyte level sensing device 47 is connected to line 41 so that the level of electrolyte in the system can be indicated, and electrical connections 49 are included so that when the electrolyte reaches a maximum allowable level an electric circuit is completed. Use is made of this circuit by connecting it with suitable conventional operating devices to control the supply or level of electrolyte. This circuit may be used, for example, to regulate the level by control of an inflow or outflow valve; or to regulate temperature, e.g., by regulating a cooling system, whereby it operates indirectly to control the rate of evaporation of water from the electrolyte. This of course affects the electrolyte level. The electrolyte chambers in each of the individual cell packs 13 are connected together through line 41, so that the electrolyte levels in all cell packs are maintained equal and controlled by the single level sensing device 47. The internal diameter of line 41 is made small enough so that only a negligible amount of electric current flows through this path between cells. The line 41 is of plastic tubing or is otherwise insulated from level detector 47 so as not to interfere with its proper operation. Alternatively, it may be of conductive material, such as metal, if properly insulated, e.g. by suitable gaskets.

By these means an optimum electrolyte level may be maintained automatically in all cells. Water produced in the fuel cell operation evaporates and/or its vapor passes outwardly through the permeable air electrodes. Obviously, the respective rates of oxidation and of water removal must ultimately come into balance. Electrolyte may be removed for reconditioning, such as removal of undesired components, or for cooling, and later returned to the cell.

Figure 2:
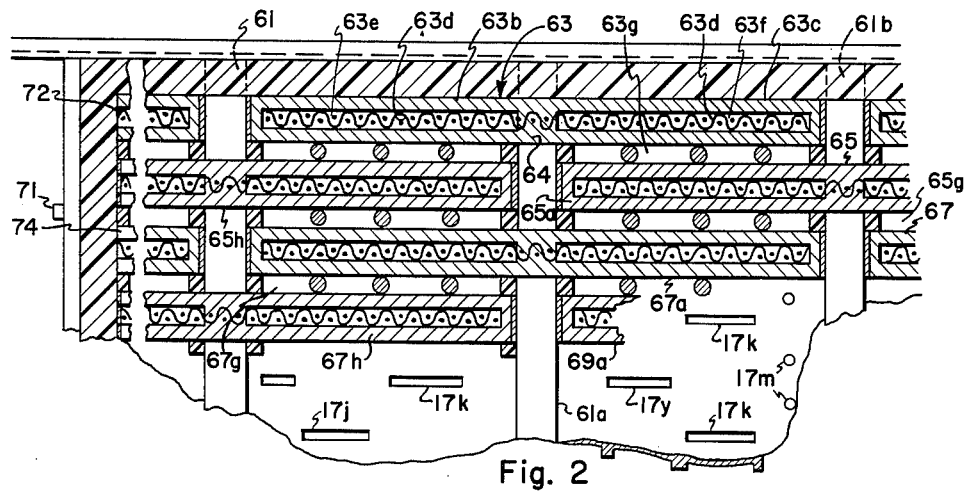
FIG. 2 is a horizontal sectional view showing in detail a part of the system of FIG. 1.
Figure 3:
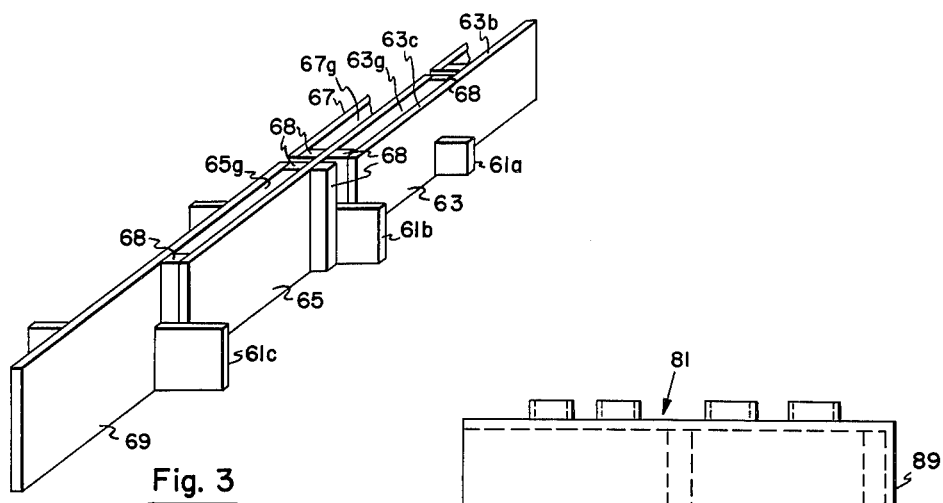
FIG. 3 is a perspective view in detail showing certain parts of the assembly of FIG. 1 to illustrate the bi-polar arrangement and the method of assembling cell components in interleaved fashion to facilitate transmission of electricity through the fuel cell assembly.

Referring now to FIGS. 2 and 3, the arrangement of the electrodes and other operative components within the fuel cell assembly will be explained in greater detail.

The structural supporting elements of the active fuel cell components comprise a plurality of spaced conductor bars of plates 61, 61a, 61b, 61c, etc. of electrically conductive material. These bars preferably are at least reasonably resistant to corrosion, which might occur through occasional or accidental contact with electrolyte or moisture associated with the operative cell components. Collectively these bars form a foundation for supporting interleaved operative cell elements or component subassemblies 63, 65, 67, 69, etc. which are arranged in staggered relation, as shown in FIG. 2. Each of these cell components comprises a relatively thin rectangular body (although other shapes may be used), formed with hollow wings, one on either side of a middle portion 64 which rides astride a conductor bar or plate 61a, or 61b, etc. They are formed, for example, by milling two openings in a preformed solid porous carbon plate of appropriate dimensions. FIG. 2 represents a horizontal cross-section through the components of FIG. 1. The fuel cell elements 63, 65, 67 and 69, etc. are all similar except for some terminal half or single wing elements. A typical fuel cell element 63 comprises a hollow dual electrode having two hollow parts or wings 63b and 63c, one on either side of a solid center 64. Each is composed of suitable porous material such as carbon.

Each wing portion 63b or 63c bears a suitable catalyst of conventional type. Each half, when assembled in the cell, has its opening 63e or 63f aligned with a fluid supply so that fuel will flow in one half, and air or oxidizer fluid in the other. To minimize internal resistance, the normal electrical conductivity of the electrode per se is preferably augmented by providing a sinuous current-conducting screen in each opening. This provides multiple contact with electrode material on both sides of the openings 63e, 63f. This metallic current-gathering element 63d also contacts the bar or plate 61a; hence a given electrode element such as 63, including both its wings, its bar 61a, etc. and the metal current-gathering member 63d are all at the same electrical potential. The member 63d is made of a suitable metal and it should be reasonably resistant to corrosion. For example, the screen members 63d, like the current distributors 61a, etc., may be of aluminum, steel, Monel metal, or of brass or copper, etc., and may be provided with a suitable protective surface coating, so long as it remains conductive. Where the method of forming the electrode permits (e.g., if molded or cast, or formed in multiple parts subsequently assembled), the current-gathering element is continuous through the solid part 64 which forms a barrier between the two wings 63b and 63. These compartments of course are fluid-tight to keep fuel and oxidizer separate. Each electrode element 63, 65, etc. has electrical connection with one and only one bar 61b or 61c, etc. Its ends are spaced of insulated from the next adjacent bar. Conductors 63d maybe of wire or other form.

Each of the hollow electrode elements connected to an interior bar 61a or 61b, etc. is of a size to substantially span the space between two alternate current distributors, e.g., from 61a to 61c. Each electrode element is formed to straddle and also have firm electric contact with the intermediate current distributor. Liquid-tight seals are provided to keep compartments separate and prevent leakage of electrolyte, fuel, or oxidation products around the current distributors.

Referring now to FIG. 3, some elements of FIG. 2 are shown, including bars or plates 61a, 61b, 61c and wing elements 63c, 63b, etc. On plate 61c an electrode element 69 is notched in its middle so that it makes firm electric contact with the plate. Insulative spacers 68, e.g., of rubber or plastic, separate ends and mid-points of element 69 from the next adjacent electrode element 65, thus providing between them an electrolyte space 65g. Spacers 68 may be perforate, porous or notched if desired, to permit freer electrolyte circulation. Electrode element 65 rides astride the next adjacent distributor bar 61b, which in turn is next to bar 61a supporting element 63. Another set of insulative spacers 68 separates electrode element 65 from the adjoining electrode element 63, thereby forming another electrolyte space 63g. In FIG. 3, which is partly diagrammatic, the electrode elements 69, 67, 65, 63 are not shown as being hollow, for simplicity, but it will be understood that they are hollow or at least provided with passageways for fuel through one wing and oxidizer, such as air, through the other.

As shown in FIG. 2, slots in the plate which forms the bottom of the cell pack are provided for feeding fuel to the appropriate wings of the electrodes, oxidizer fluid to the opposite wings, and electrolyte to the electrolyte spaces 67g', 65g and 63g, etc. The fuel slots 17j are fed from channels 17f, FIG. 1. Air or oxidizer slots 17k are fed from channels 17a and the electrolyte level in each cell element is maintained or controlled by flow upwardly or downwardly through openings 17m connecting to channels 17e.

In operation, the fuel in the right half or wing 63c of electrode element 63 reacts with electrolyte in zone or space 63g, FIG. 2, to release electrons which can flow along conductor 63d to bar 61a. At the same time, electrons are taken up by the left wing 63b, which is at the same voltage potential.

In the adjacent left wing of electrode 65, across the electrolyte zone 63g from the wing 63c, electrons are taken up from the right bar 61b, whose potential is one cell's voltage different from that of bar 61a. In effect, the right halves of elements 63 and 67 are part of the same electrode, i.e., they constitute the fuel electrode of a single cell. The left halves of interleaved electrodes such as 65a, 69a constitute the oxidizer electrode of the same cell. The magnitude of the current is generally proportional to the total area of these electrodes. Voltage is the sum of the various single cell potentials between bars 61a, 61b plus 61b, 61c, etc.

Now referring again to FIG. 2, one of the cell assembly terminals, for example, the negative terminal, is shown at 71 at one end of the assembly. This is electrically connected to a series of half cell assemblies, for example, the fuel cell components 72, 74. Interleaved between these components are the next set of full-length assemblies comprising the frames 65h, 67h which span alternately two of the spaces between current distributors 61a, etc.

The arrangement is such that when air is fed into the left half of each electrode element and fuel is fed into its right half, a single cell potential is established between adjacent cell components across an electrolyte in either half of the assembly. All components in a given cell pack semi-unit 13 are either at the negative or the positive electric potential of a single cell. In the next unit to the right, the components of the same elements are at the higher potential of the first cell but the interleaved components, connected as they are to the next bar 61b, for example, are at a potential higher by the electromotive force of one cell. In other words, each of the current distributors 61a, etc. which is electrically connected to the wire grid or screen 63d, 67d, etc., represents a cell potential. These potentials therefore are all in series without any external connections between the distributors 61.

Figure 4:
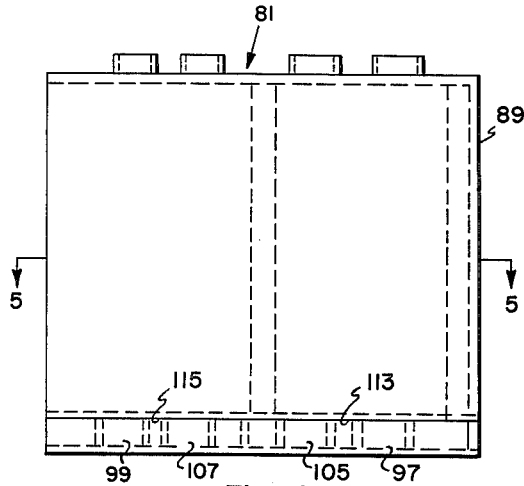
FIG. 4 is an elevational view of a modified cell.
Figure 5:
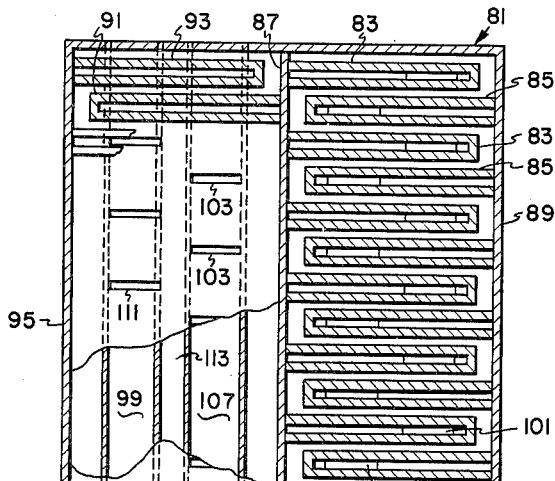
FIG. 5 is a horizontal section taken substantially along the line 5—5 of FIG. 4.

Referring now to FIGS. 4 and 5, there is shown another arrangement making use of the same principle. Here a casing 81 is provided with duct work at the bottom to supply electrolyte, fuel and oxidizer to cell components within the casing. In FIG. 5 the cell components are shown as comprising interleaved hollow electrodes 83 and 85. The alternate branch electrode elements 83 are connected to a supporting member 87, whereas the other interleaved electrode elements 85 are connected to another supporting member 89. As seen in FIG. 5, the support 89 may be part of an end wall member of the cell pack or assembly, whereas the support 87 is shown as an intermediate member. Support 87 may also support hollow electrodes 91 extending leftward and interleaved between other electrodes 93 supported by another conductor, e.g., a wall member 95.

Referring back to FIG. 4, ducts 97 and 99 are provided for supplying air to the hollow electrodes arranged above them. The ducts are situated under outlet slits 101 and 111, FIG. 5 respectively, by means of which the oxidizing air or other fluid can be passed upwardly through each of the hollow electrodes 83 or 93. Other ducts 105, 107 are provided to feed fuel through slots 109 or 103 to the hollow fuel electrode elements 85 or 91 in the same manner.

Additional ducts 113 and 115 are provided to supply electrolyte which fills the labyrinthine space between the interleaved electrodes. Here the arrangement is such that the hollow electrode components 85 are all at the same potential. The electrodes 83 interleaved between them are at a potential which is different by that of a single cell, and the electrodes 93 are different by a two cell potential. The electro-potential may, of course, be increased to any extent desired by extending the structure. The arrangement thus affords a large surface area for high current output combined with enough cells in series to give the desired voltage.

Figure 6:
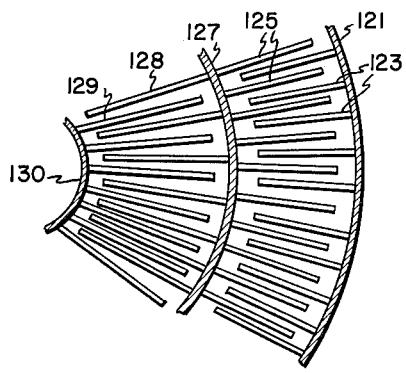
FIG. 6 is a fragmentary sectional view of another modification.

Now referring to FIG. 6, a similar arrangement is shown for annular cell construction. Here the outer casing of the cell indicated at 121, carries hollow branch electrodes 123, interleaved between other hollow electrodes 125 supported by an intermediate annular support 127. The latter in turn also carries radially inwardly extending hollow electrodes 128. Between the latter are interleaved a further set of outwardly radially extending electrodes 129 supported by an inner annular member 130. It will be understood that the annular members 121, 127 and 130 are all fluid tight and that fuel or air respectively will be supplied to the interior of each of the hollow electrodes, electrolyte filling the outer space around all of them. The inner band constitutes a cell which is in series with the outer band without any external electrical connection. Additional annular units can be added to the inside or outside to build up to the desired potential. The large electrode surface area gives high current capacity in a compact space. This arrangement lends itself well to the building of rugged cell assemblies which may be subjected to hard usage. It also lends itself to the construction of pressurized cells. The whole assembly may be enclosed in an outer vessel adapted to withstand high pressure since the over-all outer container can conveniently be of a cylindrical form and thus more suitable for a pressure vessel.

It will be understood that the hollow electrodes, although shown in exaggerated thickness for clarity, will in practice be relatively thin members so that a large number of them can be inserted in a relatively small space. The hollow space must merely be sufficient for feeding the reactant materials in sufficient volume.

Figure 7:
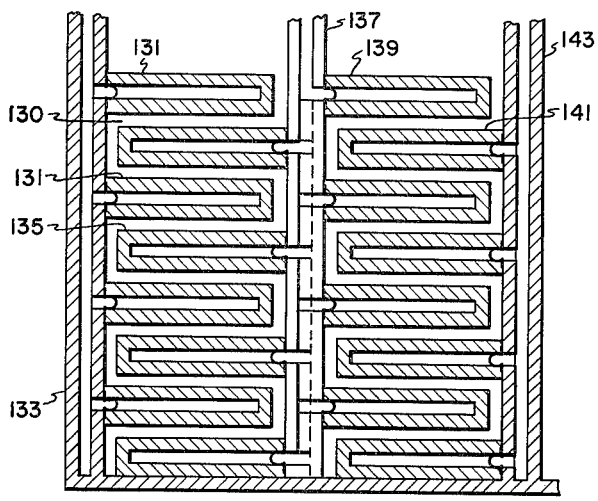
FIG. 7 is a horizontal sectional view of still another modification.
Figure 8:
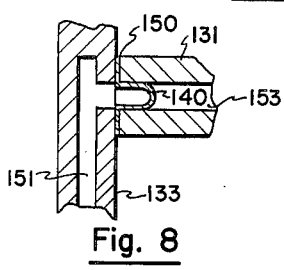
FIG. 8 is an enlarged detail fragmentary section of the modification of FIG. 7, showing a fastening element in detail.

Referring now to FIGS. 7 and 8, another arrangement is shown wherein branched electrodes 131, also hollow in form, are supported by a wall or partition member 133. Interleaved between branched electrodes 131 are another set 135 supported by a partition member 137. The latter supports on its opposite side hollow electrodes 139 which are interleaved between other electrodes 141 supported by still another partition member 143. Electrodes 131, 135, 139 and 141 are all relatively thin, though shown in substantial thickness for better understanding. They may be made by molding and baking carbonaceous materials, or by milling out previously formed blocks of appropriate dimensions. The partition members 133, 137 and 143 are manifolded or provided with ducts in such a way that fluid fuel or fluid oxidizer may be supplied to the appropriate hollow branched electrodes. Thus, each of the branched electrodes is fed internally with the appropriate reactant materials, fuel or oxidizer as required, to react and to set up a voltage. Collectively, the branches associated with a trunk electrode produce electric current by cooperation with their opposite branch electrode elements separated by electrolyte which fills the labyrinthine space 130.

It will be understood that in the case of the structures of FIGS. 4 and 5, as well as in the case of FIG. 7, the wall or partition members serve as current gathering means or as current distributor means as well as separating media for reactant fluids. The cells which have large surface areas in each, operate with their voltage potentials in series. Hence it is necessary only to provide external connections to the end members, assuming that proper conductors for gathering current are provided in the structure. The partitions 137, 143, etc. may be multiplied indefinitely to produce the desired voltage and the large surface areas of the electrodes produce the desired heavy electric current. Of course, other assemblies may be connected in parallel or in series, or both, to satisfy any current and voltage demands.

In FIG. 8 a detailed arrangement is shown whereby an electrode branch element 131 is structurally connected to a wall member 133 by a metallic clip 140. This arrangement holds the hollow electrode in place but it will be understood that a fluidtight seal is required at the juncture 150 between the hollow electrode 131 and the partition member 133, which also supplies a fluid reactant, either fuel or oxidizer, through its interior channel 151 communicating with the inner space 153 in the electrode 131. Hence all such connections must be made fluidtight.

Figure 9:
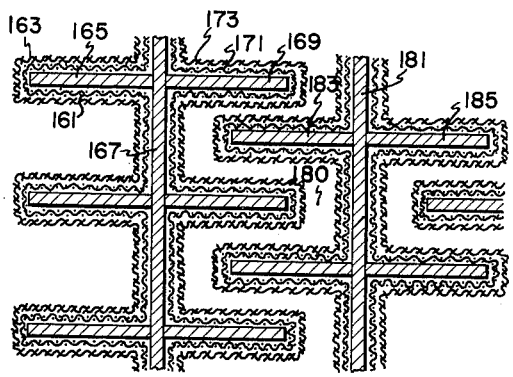
FIG. 9 is a fragmentary detailed sectional view of another modification.

Now referring to FIG. 9, there is shown another arrangement which is analogous in every respect to those described above. This modification, however, uses a current gathering foraminated wire or screen member 161 located inside a somewhat flexible porous fabric electrode element 163. The latter is a specially prepared carbonaceous or metal bearing fabric. It is rather impermeable to fluid flow but sufficiently porous to perform the electrode function. Both the current gathering and distributing wire screen 161 and the flexible and porous electrode covering 163 are formed around branching structural members 165, e.g., of rigid materials, supported by a suitable trunk member 167. On the opposite side of trunk 167, other frame elements 169 extend and these are similarly wrapped with a foraminated conductive screen element 171 and a porous electrode element of flexible type 173. The porous coverings 163 and 173 may be formed of any suitable electrode material, but a commercially available carbonaceous fabric treated to incorporate metallic and/or other catalytic constituents is presently preferred. This fabric has the requisite permeability to pass the reactants to the catalytic surface in contact with the electrolyte without permitting undue passage of fuel or oxidizer fluid, hence the flexible coverings 163, 173 perform the precise function of the electrodes 131, 135, etc. of FIG. 7, or the electrodes 83, 85, etc. of FIG. 5. Their electrical current conducting properties, however, are greatly assisted by the internal wire fabric. The trunk member 167 and branch members 165 and 169 are also electrically conductive to facilitate efficient distribution of the currents generated in the cells.

Another trunk member 181 has branches 183 and 185, which are similarly wrapped with the wire screening and the carbonaceous electrode fabric. It will be understood that the frame elements 167 and 181 and the attachments of their wrappings must be fluid-tight so as to keep oxidizer on one side and fuel on the other. The fuel and oxidizer may be passed respectively to the extremities of the branches through the screen wire which serves as a spacer and provides a fluid flow path between the supporting arms 165, for example, and the electrode fabric 163. Hence, by feeding, say, the oxidizer upwardly along the left side of the trunk member 167, and feeding fuel along its right side, the branch electrodes 163 become oxidizer electrodes whereas branch electrodes 173 function as the fuel side. Likewise, in the adjoining structure the electrodes to the left are fed with the oxidizer, whereas those to the right are fed with fuel. Electrolyte fills the sinuous or labyrinthine intervening space 180 and the cell operates in series in the same manner as those described above.

Figure 10:
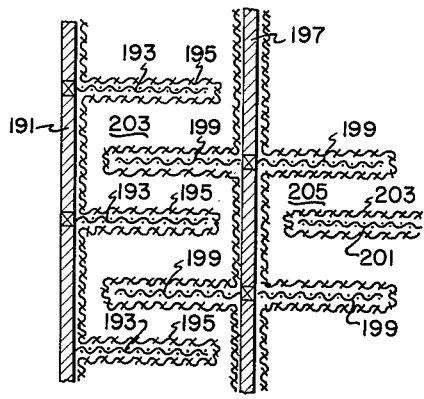
FIG. 10 shows a fragmentary section of still another modification.

In FIG. 10 another modification is shown which is generally similar to that of FIG. 9, except that the rigid arms 165, 169, etc. of FIG. 9 are eliminated, using the reticulated screen itself as the electrode spine. A wire screen of moderate rigidity is quite suitable for this purpose. Thus, a wall member 191, which is a conductor, or which at least is to be associated with a conductor, supports wire screen members 193. These will preferably stand in a substantially vertical plane and fluid fuel or oxidizer is fed to its lower (or upper) edge. Each is covered with a suitably porous electrode cover material 195. The fuel or oxidizer fluid must be confined inside the cover. Another trunk member 197, which need not be electrically conductive in many cases, but for efficiency is often conductive, but must form a fluid-tight partition, supports wire grid or screen elements 199, the latter extending through member 197 and on both sides. Each of these elements 199 is covered with an electrode material so that as the fuel or oxidant fluid feeds along the screen grid, it will diffuse through the electrode for its appropriate half-cell reaction in contact with electrolyte and catalyst. The next cell element comprising screen grid 201 with its covering is shown only fragmentarily. Electrolyte, of course, fills the areas 203, 205. Means for keeping the electrolyte at its proper level are not shown but may be substantially like those of FIGS. 1 and 2.

In the present case means have not been described in detail for taking care of combustion products, recirculating fuel, passing excess air through to control temperature, etc., but it will be understood that all of these means, or as many as may be necessary, will be provided as will be obvious to those skilled in the art.

The active components of the electrodes in all the modifications described above are well-known and need not be described in detail. Suitable catalysts, electrolytes, oxidants and fuels have been described often in the literature and need not be repeated here since this invention provides novel apparatus for more efficient utilization of the fuel cell principle and is not limited to the use of any particular catalyst, electrolyte, etc. Thus, any catalytic material that will promote the half-cell reaction associated with the electrode involved may be used. Naturally, the acidity or basicity of the electrolyte to be used will be considered in choosing catalysts. Hence, in accordance with this invention, any suitable fuel cell catalyst formed in or on the electrode branch elements may be used.

In all the various modifications described, it will be noted that the arrangements make it possible to:

(1) Obtain very large surface area for each electrode without using large sheets or slabs as electrodes, thereby eliminating heavy breakage costs of carbon sheets;
(2) Reduce internal resistance to a very low level;
(3) Connect cells in series without external connections;
(4) Obtain high power to volume ratio in multiple cell assemblies.

Other modifications consistent with the spirt of the invention will suggest themselves to those skilled in the art and it is intended to cover them so far as the prior art and the following claims permit.

As suggested above, the cell assemblies of this invention have outstanding utility for electro-chemical processes, including partial oxidation of carbonaceous fuels to products such as alcohols, aldehydes, ketones, acids, etc., concurrently with power production. The facility of introducing and removing electrolyte, as compared with multiple cell assemblies makes control of electrolyte level a simple matter. Also, recovery of chemical products from the electrolyte is simple and convenient, for example, where the electrolyte itself contains a fuel or other reactant which changes in the process.

By reason of the interconnected electrolyte system, together with the ease of circulation of electrolyte into and out of the cell zone, several operating advantages may be achieved. Electrolyte may be removed for separation of chemical intermediates, or for purification. When desired, the electrolyte may be passed through heat exchangers for heat control. Thus the invention provides considerable operating flexibility.

Since corrosion of metal parts is likely to occur on contact with electrolyte, or reaction products of fuel and/or electrolyte, the structural elements are suitably sealed in or coated to give them protection. Where sinuous current-gathering elements are shown, as in FIGS. 2, 9, 10, and in other instances where they are not shown, it will be understood that these may be of perforated, reticulated, or embossed metal work, wire screening, corrugated and punched plates, etc. The particular form can be varied as desired, so long as multiple contact points are provided for efficient current gathering and distribution. In the case of FIG. 6, the plate radial length in any annulus will preferably be adjusted so that total plate areas in all annuli are equal, since these are effectively connected in series.

What is claimed is:

1. In a fuel cell, the combination of a plurality of banks of branched electrodes arranged in annular series and having their branches interleaved, current gathering means in each annular electrode, means for feeding fuel to some branches and oxidizer to other branches of each electrode, means for maintaining a body of electrolyte between adjacent electrodes, the arrangement being such that substantially equal total active electrode areas are presented in each annulus.

2. A fuel cell combination comprising a pair of opposed branched electrodes having their branches interleaved to define a continuous and sinuous electrolyte zone between them, means for feeding fuel to individual branches of one of said pair, means for feeding oxidizer to individual branches of the other one of said pair, and means for controlling the electrolyte in said zone, said branched electrodes comprising conductive foraminous means adapted to serve simultaneously as an electrical conductor and as a conduit for the flow of appropriate fluid.

3. A fuel cell combination comprising a pair of opposed branched electrodes having their branches interleaved to define a continuous and sinuous electrolyte zone between them, means for feeding fuel to individual branches of one of said pair, means for feeding oxidizer to individual branches of the other one of said pair, and means for controlling the electrolyte level in said zone, said branched electrodes comprises a layer of metal screening adapted to serve simultaneously as an electrical conductor and as a conduit for flow of appropriate fluid.

4. A low voltage, high current fuel cell assembly comprising in combination a circular casing having a pair of electric terminals associated therewith, a plurality of current distributors in the form of concentric cylindrical elements arranged at spaced intervals between said terminals, a plurality of branch electrode elements connected to and extending across each of said distributors, at least some of said elements being interleaved between elements connected to an adjacent distributor to form opposite fuel cell poles, an electrolyte in the space between said interleaved elements, means for feeding fuel to elements of one pole and oxidizer to elements of the opposite pole, gasket and frame means enclosing all said elements, electrically non-conductive spacers between adjacent electrode elements within a cell, the whole assembly being held together in fluid-tight relationship in said casing so as to control flow of fuel, oxidizer, electrolyte and combustion products within proper zones for efficient fuel cell operation.

References Cited by the Examiner
UNITED STATES PATENTS

| | | | |
|---|---|---|---|
| 2,925,454 | 2/1960 | Justi et al. | 136—86 |
| 2,969,315 | 1/1961 | Bacon | 136—86 |
| 3,003,011 | 10/1961 | Artajo | 136—6 |
| 3,005,864 | 10/1961 | Sharpe | 136—120 X |
| 3,101,285 | 8/1963 | Tantram | 136—120 |

FOREIGN PATENTS

| | | |
|---|---|---|
| 14,050 | 6/1912 | Great Britain. |
| 95,122 | 6/1922 | Switzerland. |

WINSTON A. DOUGLAS, *Primary Examiner.*

JOHN R. SPECK, JOHN H. MACK, *Examiners.*